US008306873B2

(12) United States Patent
Smith et al.

(10) Patent No.: US 8,306,873 B2
(45) Date of Patent: Nov. 6, 2012

(54) SYSTEM AND METHOD OF MEDIA DISTRIBUTION MANAGEMENT

(76) Inventors: Joe Smith, Nashville, TN (US); Paul Wright, III, Mount Juliet, TN (US); Andrew Turner, Nashville, TN (US); Lebraun Premo, Nahshville, TN (US); Ken Premo, Nashville, TN (US)

( * ) Notice: Subject to any disclaimer, the term of this patent is extended or adjusted under 35 U.S.C. 154(b) by 303 days.

(21) Appl. No.: 12/616,648

(22) Filed: Nov. 11, 2009

(65) Prior Publication Data

US 2011/0112933 A1    May 12, 2011

(51) Int. Cl.
*G06Q 30/00* (2012.01)
(52) U.S. Cl. ........................ 705/26.7; 705/27.1
(58) Field of Classification Search .............. 705/26.7, 705/27.1
See application file for complete search history.

(56) References Cited

U.S. PATENT DOCUMENTS

| | | | |
|---|---|---|---|
| 5,892,900 A * | 4/1999 | Ginter et al. ........ | 726/26 |
| 6,304,886 B1 | 10/2001 | Bernardo et al. | |
| 6,560,639 B1 | 5/2003 | Dan et al. | |
| 6,734,878 B1 | 5/2004 | DeLuca et al. | |
| 6,823,382 B2 | 11/2004 | Stone | |
| 7,249,313 B2 | 7/2007 | Brown et al. | |
| 7,401,138 B2 | 7/2008 | Bimson et al. | |
| 7,801,722 B2 * | 9/2010 | Kotipalli et al. ........ | 704/8 |
| 2002/0010668 A1 | 1/2002 | Travis et al. | |
| 2002/0133429 A1 | 9/2002 | Lu | |
| 2003/0227481 A1 | 12/2003 | Arend et al. | |
| 2007/0094100 A1 | 4/2007 | Hodson et al. | |
| 2007/0143306 A1 | 6/2007 | Yang | |
| 2007/0240037 A1 | 10/2007 | Law-How-Hung et al. | |
| 2007/0299736 A1 | 12/2007 | Perrochon et al. | |
| 2008/0040453 A1 * | 2/2008 | Cohen ........................ | 709/219 |

OTHER PUBLICATIONS

Digital audio lectures: a library's path to sustainability, Zana Claire Etter, James Galt. Journal of the Medical Library Association. Chicago: Jul. 2009. vol. 97, Iss. 3; p. 219, downloaded form ProQuestDirect on the Internet on Aug. 3, 2012, 6 pages.*

* cited by examiner

*Primary Examiner* — James Zurita
(74) *Attorney, Agent, or Firm* — Schmeiser Olsen & Watts LLP; Michael W. Starkweather (57) ABSTRACT

There is a media distribution system and method configured to distribute media over a computerized network including a media distribution module configured to selectively permit access to media over a computerized network and including a user interface module. The media distribution system also includes an operational administration module in communication with the media distribution module and configured to facilitate operational management of the media distribution module by selectably altering operational parameters of the media distribution module. In addition, the media distribution system includes a supervisory administration module in communication with the operational administration module and configured to selectably determine operational parameters available to the operational administration module for control. Furthermore, the media distribution system includes a network module in communication with the media distribution module and configured to transfer data over a computerized network.

4 Claims, 8 Drawing Sheets

OPERATIONAL ADMINISTRATION MODULE
16

REGISTRATION MODULE
30

VALIDATION MODULE
32

DESIGN MODULE
34

SYSTEM AND METHOD OF MEDIA DISTRIBUTION MANAGEMENT

BACKGROUND OF THE INVENTION

1. Field of the Invention

The present invention relates to media distribution systems, specifically to a system and method of media distribution management.

2. Description of the Related Art

"Corporate media" is a term which refers to a system of media production, distribution, ownership, and funding which is dominated by corporations, and is governed by the capitalist imperatives of maximizing profits for the investors, stockholders, and advertisers. However, these media distribution systems typically alienate artists, musicians, authors, and composers of the original media by restricting sales, distribution, rights, and compensation to the creators of the media being distributed and sold to the public. In addition, with the increasing factor of internet media piracy, it has become harder and harder for artists, musicians, authors, and composers to collect compensation for their original work. Some improvements have been made in the field. Examples of references related to the present invention are described below, and the supported teachings of each reference are incorporated by reference herein:

U.S. Publication No. 2007/0299736 by Perrochon; Louis Vincent; et al. discloses an electric commerce system includes a broker that enables third parties to create their own independent shopping carts including items from multiple different merchants. An agent creates and stores a shopping cart containing a plurality items from one or more merchants. The customer can view the shopping cart displayed by the agent to determine whether to make a purchase. If the customer indicates a desire to purchase the items in the cart, the customer is transferred to a broker for the checkout and purchase process. The customer can purchase the items in the shopping cart in a single purchase transaction with the broker, rather than having to deal with each of the merchants. The broker interacts with the merchants to complete the purchase transaction by which the customer buys the items in the cart.

U.S. Publication No. 2007/0143306 by Yang; Jae-Hyuk discloses an integrated website management system and a management method thereof, and more specifically, to an integrated website management system and a management method thereof, in which log information on the visitors to the website and a result of searching thereof are display on a single screen so that the log information can be clearly analyzed, and contents data of a webpage can be updated in real-time using the web log analysis information and the search result. According to the present invention, when web log analysis data or search result analysis data is created, it is sent to a manager or an operator who works separately, and a programmer or a web designer does not need to update the website. All analyses and updates are performed in a single tool, and thus a prompt response can be made.

U.S. Publication No. 2007/0240037 by Law-How-Hung; France; et al. discloses Computer-implemented methods and systems for creating and managing website content involve, for example, providing a user at a computer terminal a data capture template for a user-selected content type, providing the user at the computer terminal presentation pages using content management tags, allowing the user at the computer terminal to author content using the data capture template, and allowing the user at the computer terminal to deploy the content to a server. Other aspects of the methods and systems for creating and managing website content include, for example, allowing the user to personalize content, allowing the user to embed dynamic content in the middle of static content, allowing the user to refresh the deployed content in real-time without impacting current existing user sessions on the server where content is being deployed.

U.S. Publication No. 2002/0133429 by Lu, Hsiang-Chun discloses a multi-website shopping cart implementation method, which uses a main website to provide consumers a hyperlink element linking to an associate website. When a consumer selects the hyperlink element, the main website will transmit the ID of the consumer and the verification code to the associate website so as to verify the identity of the consumer. When the consumer wants to purchase a particular commodity sold at the associate website, the main website will receive trade information transmitted from the associate website and thereby charge to the consumer. Finally, the main website places an order to the associate website and provides the name and the address of the receiver to the associate website. With the trade information, the name and the address of the receiver, the associate website sends out the commodity. The invention also discloses a multi-website shopping cart system to implement the above method.

U.S. Publication No. 2007/0094100 by Hodson; David; et al. discloses an integrated shopping cart functionality is provided on a first website so that products/services from different affiliated websites can be integrated into the shopping cart at the first website and the e-commerce functionality of the first website can be utilized to purchase the selected products/services. A framework for integrating this functionality enables the first website to integrate with affiliated websites so that an increased number of users may access the first website since the proprietor of the first website may offer various products/services from a multitude of different affiliated websites, for example by providing URL links to the affiliated websites that a user may access in order to select items from the affiliated websites. These items can be integrated into the shopping cart at the first website and purchased with a single transaction. Increased user traffic is expected at the first website since a user's shopping interests can be fulfilled at a single website. Additionally, affiliated websites are benefited by this integrated shopping cart functionality since the e-commerce functionality of the integrated shopping cart is performed by a server that is associated with the first website. Therefore, affiliated websites need not include their own e-commerce functionality. Instead, they may take advantage of the e-commerce functionality of the first website and still receive the benefits of the sale of their offered products/services to the user. Maintenance costs and overhead costs with respect to including an e-commerce software engine are therefore reduced and often eliminated as a result.

The inventions heretofore known suffer from a number of disadvantages which include being limited in application, being limited in adaptability, being expensive, being difficult to use, being unduly complex, What is needed is a system and method of media distribution management that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available systems and methods of media distribution management.

According to one embodiment of the invention, there is a media distribution system configured to distribute media over a computerized network. The media distribution system may include a media distribution module configured to selectively permit access to media over a computerized network. The media distribution module may include a user interface module may have a downloader module configured to enable a user to download media from the media distribution module. The user interface module may also include a catalog module configured to provide media to download over a computerized network. Furthermore, the user interface module may include an accounting module configured to provide purchasing functions to a user downloading media from the media distribution module.

The user interface module may include an uploader module configured to facilitate the upload of media to the media distribution module. The uploader module may include an authorization module configured to authorize the media content being uploaded to the media distribution module. The uploader module may also include an audio module configured to modify the audio controls of media uploaded to the media distribution module and a video module configured to modify the video controls of media uploaded to the media distribution module. In addition, the uploader module may include a display module configured to display media uploaded on the media distribution module and a text module configured to modify text media data uploaded to the media distribution module. Moreover, the uploader module may include a preview module configured to view the media displayed on the media distribution module before the media is available for purchase.

The media distribution system may include an operational administration module in communication with the media distribution module and configured to facilitate operational management of the media distribution module by selectably altering operational parameters of the media distribution module. The operational administration module may include a registration module configured to register users to the media distribution module and a validation module configured to validate registered users to the media distribution module. The operational administration module may also include a design module configured to facilitate modification of the user interface module. The operational parameters may include parameters selected from the group of parameters consisting of: media price, temporal availability of media, image files available for use with the user interface module, position of display elements, associations with other media distribution modules, marketing affiliates, marketing materials, interface active status, user terms, user agreements, user interface access requirements, user interface size limitations, and user interface content limitations The media distribution system may also include a supervisory administration module in communication with the operational administration module and configured to selectably determine operational parameters available to the operational administration module for control. The supervisory administration module may be configured to facilitate operational management of the media distribution module by selectably altering operational parameters of the media distribution module and that effectuation of an operational parameter automatically alters permission to alter the same operational parameter by the operational administration module. The supervisory administration module may include a help module accessible by the operational administration module and wherein the supervisory administration module may edit the contents of the help module. In addition, the supervisory administration module may be configured to edit signup automation content and setup process for setup of an operational account used by a user of the operational administration module.

Furthermore, the media distribution system may include a network module in communication with the media distribution module and configured to transfer data over a computerized network. The media distribution system may include an aggregating portal module in communication with a plurality of media distribution modules and configured to provide a user interface wherein users may view and select media offered by each of the plurality of media distribution modules and configured to credit each associated media distribution module for associated media selected thereby.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, software, instructions, circuitry, phone lines, internet lines, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998);

JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Figure 1:
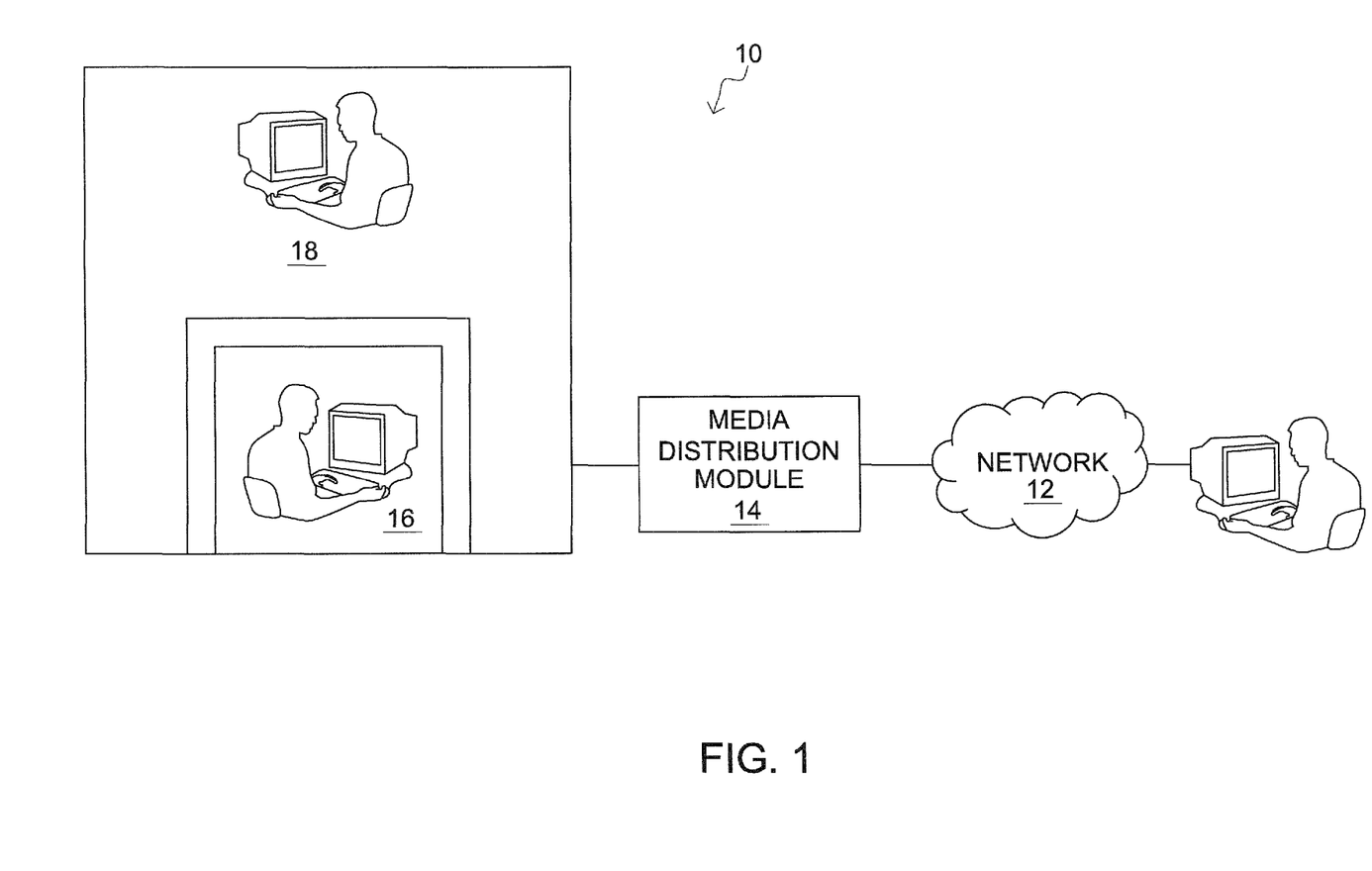
FIG. 1 is a network diagram of a media distribution system, according to one embodiment of the invention.

FIG. 1 is a network diagram of a media distribution system, according to one embodiment of the invention. There is a media distribution system 10 configured to distribute media over a computerized network 12. The media distribution system 10 includes a media distribution module 14 configured to selectively permit access to media over a computerized network 12. The media distribution system 10 also includes an operational administration module 16 in communication with the media distribution module 14 and configured to facilitate operational management of the media distribution module 14 by selectably altering operational parameters of the media distribution module 14. The operational parameters may include parameters selected from the group of parameters consisting of: media price, temporal availability of media, image files available for use with the user interface module, position of display elements, associations with other media distribution modules, marketing affiliates, marketing materials, interface active status, user terms, user agreements, user interface access requirements, user interface size limitations, and user interface content limitations. As illustrated in FIG. 1, the media distribution system 10 also includes a supervisory administration module 18 in communication with the operational administration module 16 and configured to selectably determine operational parameters available to the operational administration module 16 for control. The supervisory administration module 18 is configured to facilitate operational management of the media distribution module 14 by selectably altering operational parameters of the media distribution module 14 and that effectuation of an operational parameter automatically alters permission to alter the same operational parameter by the operational administration module 16.

The network provides for communication between devices and may include one or more of the following systems/devices for communication: internet, intranet, wireless network, telephone network, cellular network, satellite network, and the like.

The media distribution module may include a website with a shopping cart module and software configured to provide for the download of media over the network under specific conditions, such as but not limited to when authorized by the shopping cart module. The media distribution module may include a media display and/or file transfer system/device such as but not limited to an FTP server, an http server, a website, a cellphone application (such as but not limited to applications available for download on the iPhone brand of cell phones by Apple Computer, Inc. of Cupertino Calif.

The operational administration module may include one or more modules, tools, systems, devices, applets, content management systems (CMS) and/or functions configured to facilitate generation, manipulation, control, modification, and/or production of a media distribution module. Some non-limiting examples include: the online website builder branded doodlekit found http://doodlekit.com by Doodlebit, L.L.C. of Lee's Summit Mo.; the Blue Voda website builder by VodaHost of Wilmington, Del. and available for download at www.bluevoda.com; the dynamic portal engine and CMS branded Joomla by Open Source Matters, Inc. of New York and available for download at www.joomla.org; the PayPal branded shopping cart available at https://www.paypal.com/cgi-bin/webscr?and=p/xcl/rec/sc-intro-outside by PayPal of San Jose Calif.

The supervisory administration module operates to manage and control one or more operational administration modules and to modify and/or determine the acceptable parameters within which such may operate. The supervisory administration module may include one or more of modules, tools, systems, devices, applets, content management systems (CMS) and/or functions configured to facilitate generation, manipulation, control, modification, and/or production of a media distribution module and/or may include modules, tools, systems, devices, applets, CMS, and/or functions, modules, tools, systems, devices for manipulating, organizing, coordinating, and/or controlling the same. A supervisory administration module may include an executable configured to generate a specialized configuration file that may be read and utilized by an operational administration module to determine the range of parameter manipulation available to a user of such when operating under an account associated with the specialized configuration file.

In operation of one embodiment of the invention, a user designs a media distribution module configured to distribute media over a computerized network. The user uses an operational administration module to design the media distribution module for distributing media. The operational administration module is controlled by a set of parameters set up by a supervisory administration module. The supervisory administration module determines the operational parameters to the operational administration module for control by the user. The user uploads media to the media distribution module over the computerized network and allows customers to download media from the computerized network through the media distribution module.

Figure 2:
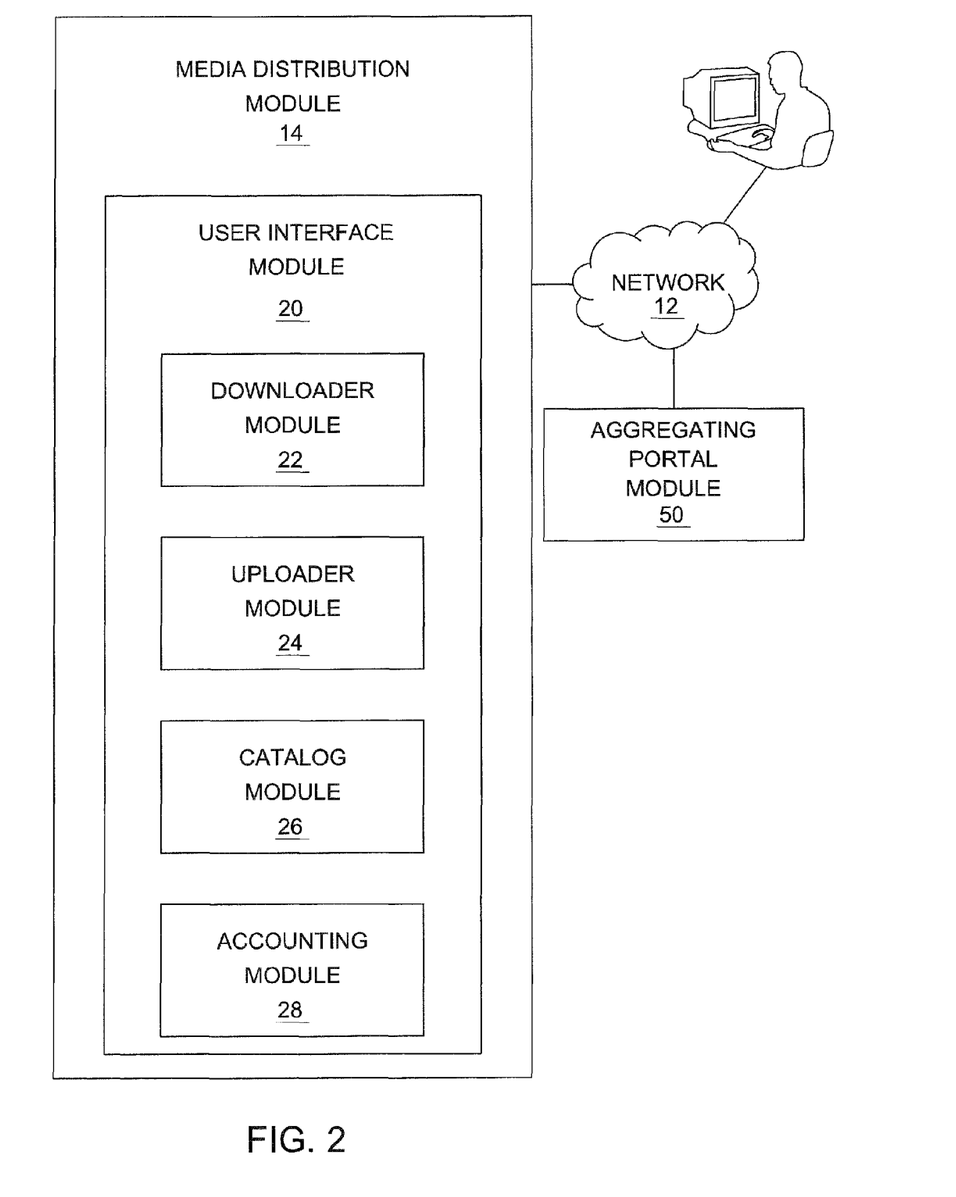
FIG. 2 is a block diagram of a media distribution module of a media distribution system, according to one embodiment of the invention.

FIG. 2 is a block diagram of a media distribution module of a media distribution system, according to one embodiment of the invention. There is a media distribution system configured to distribute media over a computerized network. The media distribution system includes a media distribution module 14 configured to selectively permit access to media over a computerized network 12. The media distribution module 14 include a user interface module 20 having a downloader module 22 configured to enable a user to download media from the media distribution module 14. The user interface module also includes a catalog module 26 configured to provide media to download over a computerized network. The user interface module includes an accounting module 28 configured to provide purchasing functions to a user downloading media from the media distribution module 14. Furthermore, the user interface module 20 includes an uploader module 24 configured to facilitate the upload of media to the media distribution module. Furthermore, the media distribution module is in communication with a network module 12 in communication with the media distribution module and configured to transfer data over a computerized network. The media distribution system includes an aggregating portal module 50 in communication with a plurality of media distribution modules through a computerized network and configured to provide a user interface wherein users view and select media offered by each of the plurality of media distribution modules and configured to credit each associated media distribution module for associated media selected thereby.

In operation of one embodiment of the invention, a user designs a media distribution module over a computerized network configured to distribute media. The user navigates through the user interface module of the media distribution module and uploads media to the media distribution module through the computerized network with the uploader module. The user catalogs the media using the catalog module and allows customers to search the catalog module for media to download. The customer is in communication with the media distribution module through the computerized network and searches through the catalog module for media to download. The customer downloads media through the downloader module and purchases the media through the accounting module. The customer may also search a plurality of media distribution modules for media to download by using the aggregating portal module in communication through the computerized network.

Figure 3:
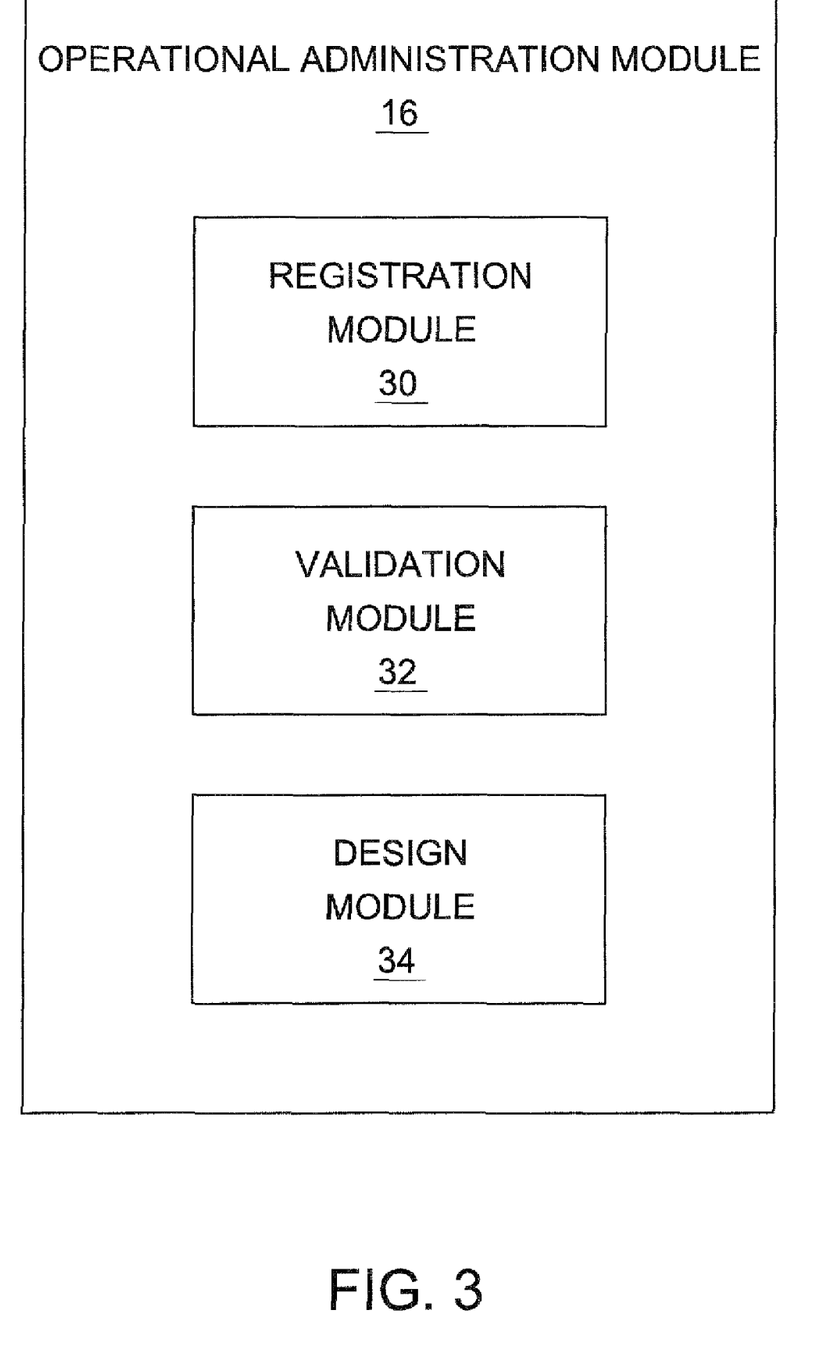
FIG. 3 is a block diagram of a user interface module of a media distribution module, according to one embodiment of the invention.

FIG. 3 is a block diagram of an operational administration module of a media distribution module, according to one embodiment of the invention. There is a media distribution system configured to distribute media over a computerized network. The media distribution system includes an operational administration module 16 in communication with the media distribution module and configured to facilitate operational management of the media distribution module by selectably altering operational parameters of the media distribution module. The operational administration module 16 includes a registration module 30 configured to register users to the media distribution module and a validation module 32 configured to validate registered users to the media distribution module. The operational administration module 16 also includes a design module 34 configured to facilitate modification of the user interface module. The operational parameters may include parameters selected from the group of parameters consisting of: media price, temporal availability of media, image files available for use with the user interface module, position of display elements, associations with other media distribution modules, marketing affiliates, marketing materials, interface active status, user terms, user agreements, user interface access requirements, user interface size limitations, and user interface content limitations.

In operation of one embodiment of the invention, a user registers for an operational administration module by completing a user registration, including user data, from a registration module of the operational administration module. The operational administration module validates the user data and allows access to the operational administration module. The user then uses a design module to design a media distribution module for customers to download and purchase media. The operational administration module includes a set of operational parameters, including design module parameters established by the supervisory administration module.

Figure 4:
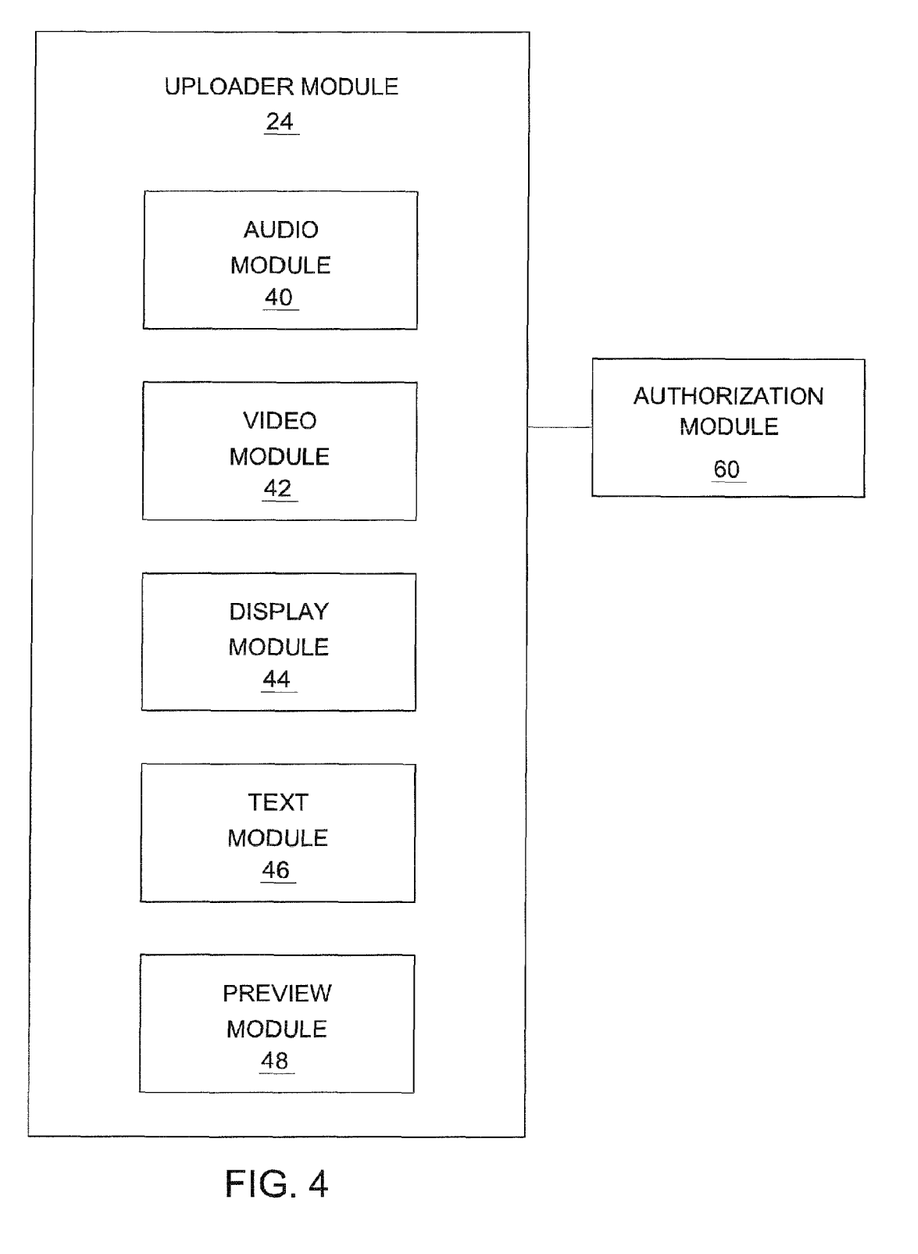
FIG. 4 is a block diagram of an uploader module of a media distribution module, according to one embodiment of the invention.

FIG. 4 is a block diagram of an uploader module of a media distribution module, according to one embodiment of the invention. The user interface modules includes an uploader module 24 configured to facilitate the upload of media to the media distribution module. The uploader module 24 includes an authorization module 60 configured to authorize the media content being uploaded to the media distribution module. The uploader module 24 also includes an audio module 40 configured to modify the audio controls of media uploaded to the media distribution module and a video module 42 configured to modify the video controls of media uploaded to the media distribution module. In addition, the uploader module 24 includes a display module 44 configured to display media uploaded on the media distribution module and a text module 46 configured to modify text media data uploaded to the media distribution module. Moreover, the uploader module 24 includes a preview module 48 configured to view the media displayed on the media distribution module before the media is available for purchase.

In operation of one embodiment of the invention, a registered user of an operational administration module uploads media through a computerized network to a media distribution module. The user uploads media that is authorized for distribution by an authorization module configured to check the contents of the media. The media is uploaded to the uploader module, and then the user modifies the audio, video, display, and text of the media through the correlating modules therefrom. The user previews the audio, video, display, and text of the media before allowing the media to be distributed over a computerized network.

Figure 5:
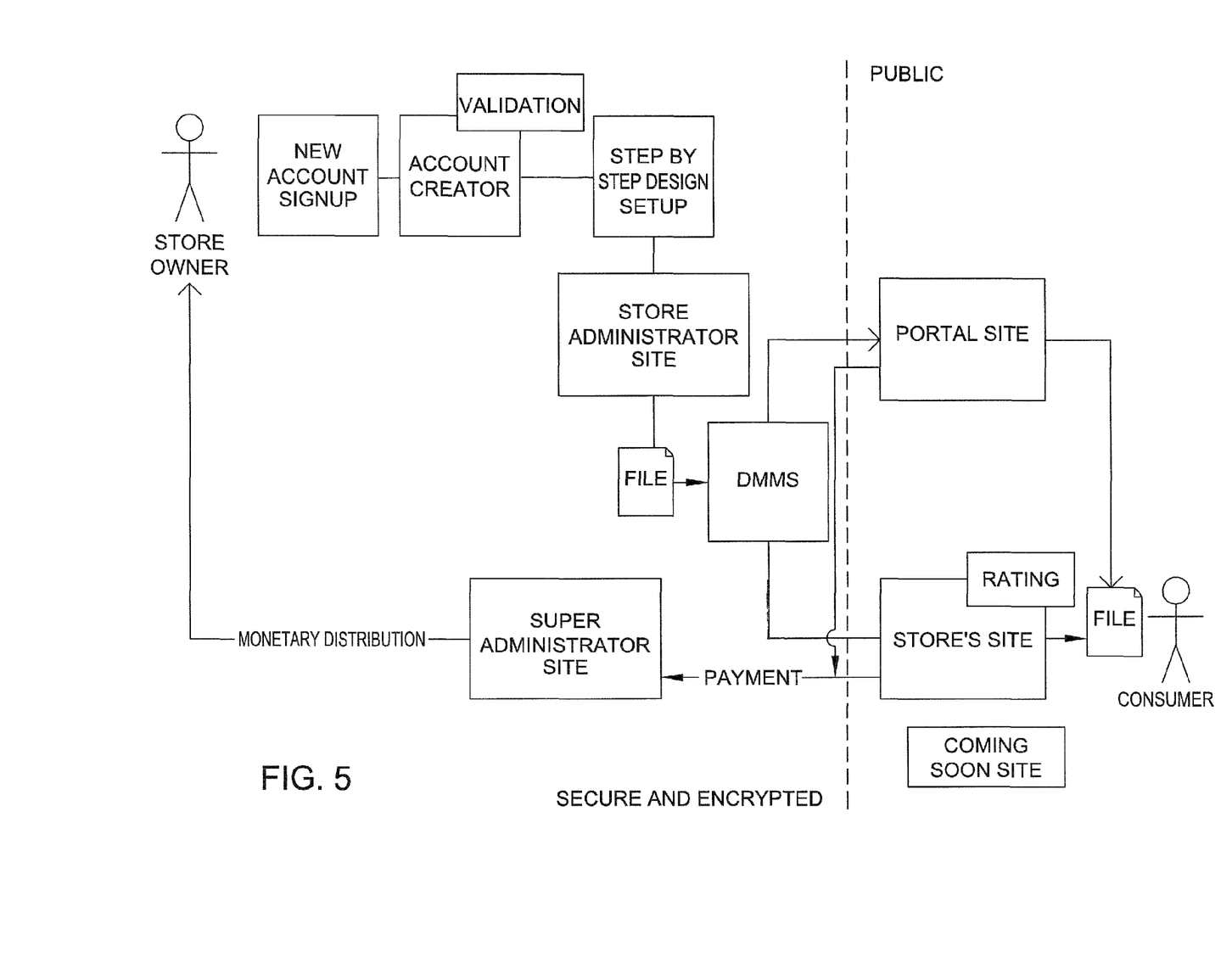
FIG. 5 is an exemplary example of a media distribution system, according to one embodiment of the invention.

FIG. 5 illustrates modules and systems in communication with one another to enable a store owner and consumer to connect and transact business according to one embodiment of the invention. There is a media distribution system configured to distribute media through a store site over a computerized network. The system includes a new account signup module configured to enable public users to purchase and create a store site. The system also includes an account creator module configured to activate a domain, a hostname, and deliver an email account activation link to a user. The account creator module includes a validation module configured to email a validation link to the owner of the store site. The validation link is configured to activate the store site for design by the owner.

In addition, the system includes a step by step deign setup module configured to setup the store site. The setup module of the store site may include, but not limited to: advertisements, logos, slogans, testimonials, background information, etc. The system also includes a store administration site module configured to manage the site design, content, and products available on the store site over a computerized network. The owner creates a style or selects from a style already created. The system includes a DMMS module configured to provide a digital media management server having a hard disc array controlled by a server that securely delivers files to be sold on the store site.

Furthermore, the system includes a portal site configured to provide files to a consumer, the consumer purchases files from the store site. The system also includes a super administration site module configured to manage the store administration site module, the DMMS module, content, files, authorization, registration, marketing, portal content, help content, and escrow data of the media distribution system. The super administration site module is configured to control the content and available content to be displayed by the store administration site module on the store site over the computerized network.

In operation of one embodiment of the invention, a user signs up for a new account for a store site over a computerized network. The system creates a new user account and validates data, given by the user, for the creation of a store site for distributing media. The system guides the user through a step by step design setup of a store site. The user selects an account name, a domain/hostname, a storage module and pays for the creation of the account and store site. The user receives an email validation link to validate the creation of the store site and user data. The user designs the store site using tools of the store administration site module; such as, but not limited to modifying the layout, content, files, and style of the store site. The user uploads files to the store site for distribution. Consumers view the store site over the computerized network and purchase files from the store site. The consumer downloads the file and delivers payment to the super administration site module, of the system, and the funds are dispersed accordingly to the user.

Figure 6:
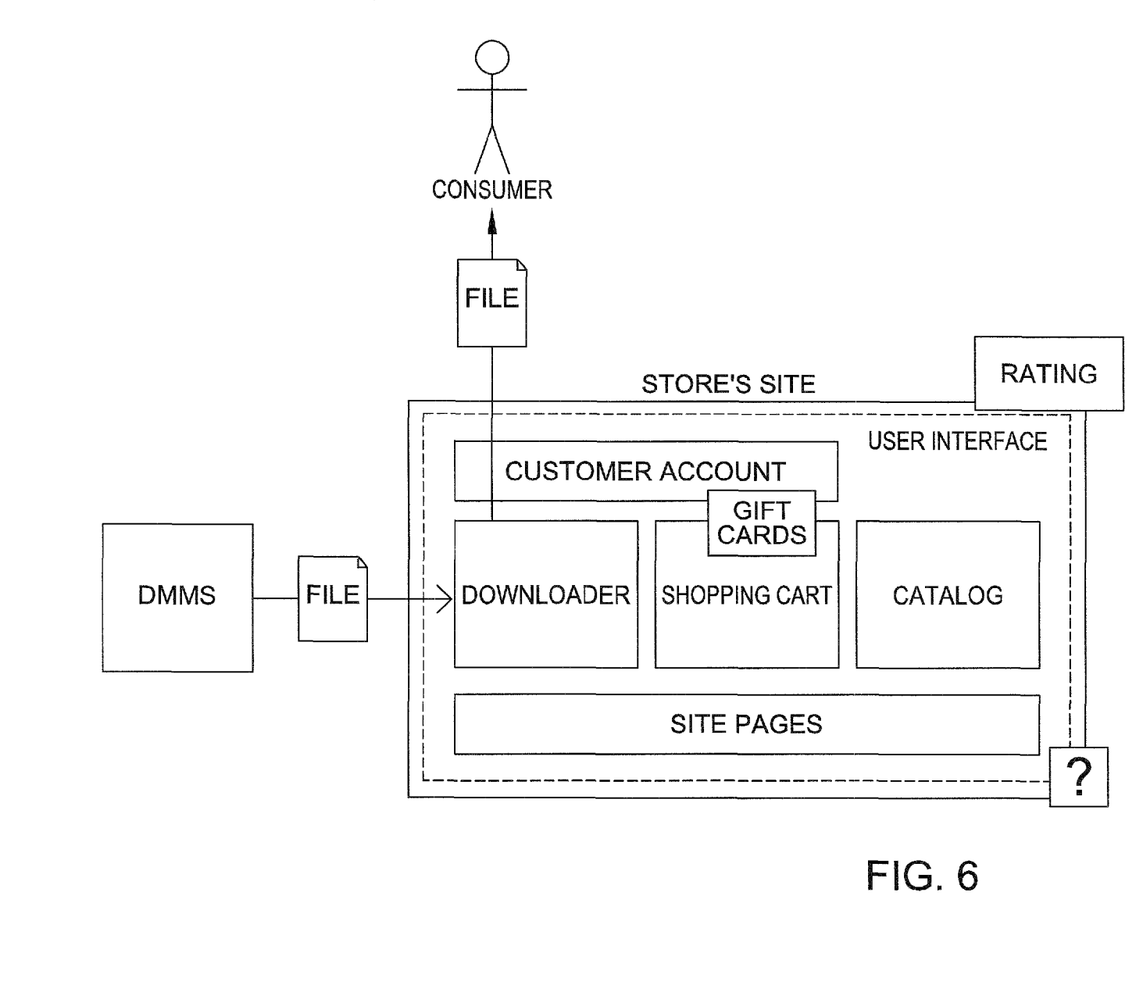
FIG. 6 is an exemplary example of an user interface module of a media distribution module, according to one embodiment of the invention.

FIG. 6 illustrates a more detailed view of a store website in communication with a consumer that is provided a media file stored through a DMMS (Digital Media Management Server) according to one embodiment of the invention. There is a store site module in communication with a computerized network, and configured to provide media for distribution. The store site module includes an user interface module having a customer account module configured to register and validate consumer data for store site registration. The store site module also includes a catalog module configured to categorize files available for purchase from the store site. In addition, the store site module includes a downloader module configured to provide downloading capabilities to a consumer to download media files purchased from the stores site module. In addition, the store site module includes a shopping cart module configured to provide purchasing capabilities to a consumer for downloading files. The store site module also includes a rating module configured to provide feedback from the consumer regarding the contents, layouts, designs, and operation of the store site module. The store site module further includes a help module configured to provide help navigating, operating, searching, etc. the store site. Furthermore, the store site module includes a site pages configured to provide links to other store sites created by the owner of the store site module.

In operation of one embodiment of the invention, a consumer views a store site module over a computerized network. The consumer registers with the store site module and creates a customer account. The consumer searches though a catalog module of the store site module and finds files for download. The consumer purchases the files from the store site module and downloads the purchased file from a secure downloader module from the store site module. The consumer may rate the user interface of the store site module, using the rating module and also view problem solving solutions through the help module. In addition, the consumer may purchase gift cards from the shopping cart module of the store site module for future purchases. Furthermore, the consumer may view and search site pages related to the store site module.

Figure 7:
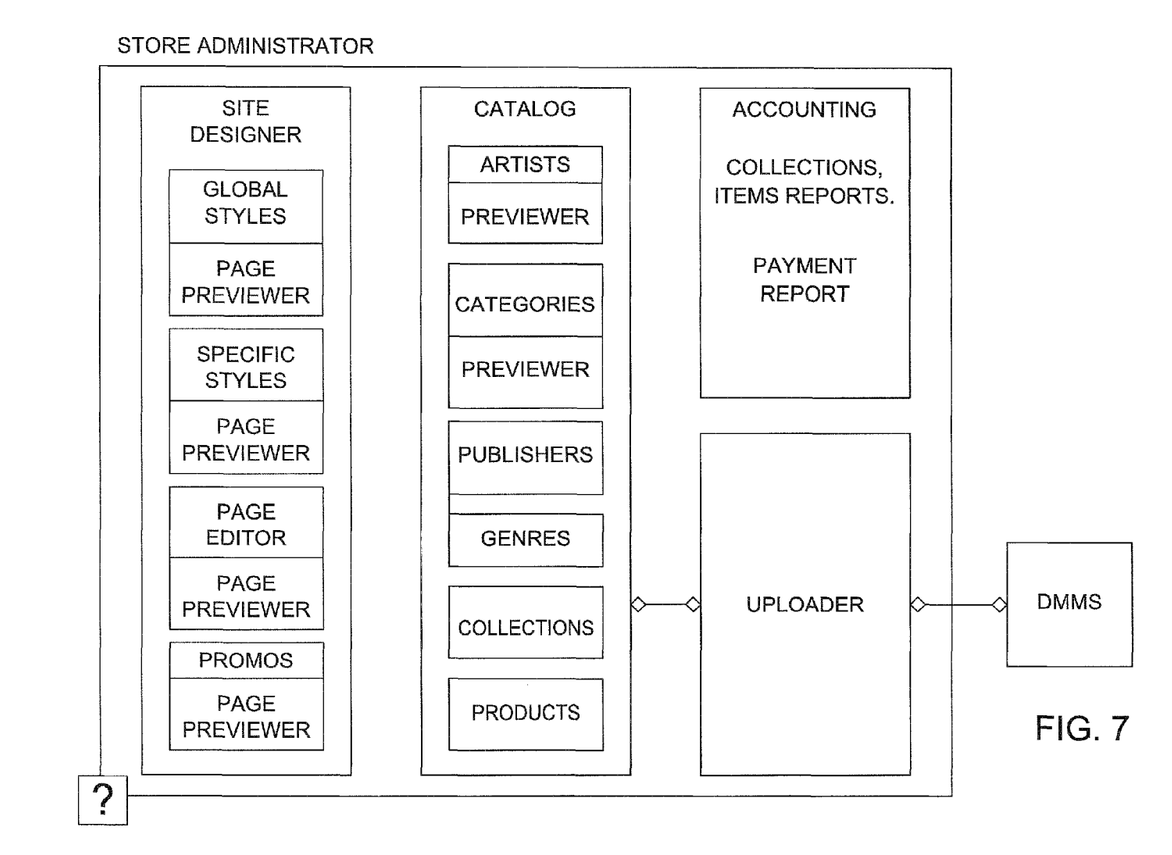
FIG. 7 is an exemplary example of a media distribution module of a media distribution module, according to one embodiment of the invention.

FIG. 7 illustrates in greater detail a store administrator module including modules and systems configured to facilitate generation and management of a media distribution module according to one embodiment of the invention. The store administration module includes a site designer module configured to modify a style, a layout, a design, and content of the store site module. The site designer module includes a global style module configured to provide a consistent style for the user interface display of the store site module. The site designer module also includes a specific style module configured to modify and edit the global style module. In addition, the site designer module includes a page editor module configured to edit the content of the store site module. Furthermore, the site designer module includes a promos module configured to allow create and edit promotional banners and product placements on the store site module. The site designer module also includes a page previewer module configured to view the page display of the store site module before it is viewed by consumers over the computerized network.

The store administration module also includes a catalog module configured to categorize files available for purchase from the store site. The catalog module includes an artist module configured to categorize files by an artist's name. The catalog module also includes a categories module configured to create custom categories related to the files available for download from the store site module. The catalog module also includes a publishers module configured to provide operational controls to a user to add, edit, and delete publishers. In addition, the catalog module includes a genre module configured to categorize files by genre relationship and enable a consumer to search files by genre. The catalog module also includes a collections module configured to categorize, sort, and organize files viewed on the interface module of the store site module. Furthermore, the catalog module includes a products module configured to store files for download by a consumer.

The store administration module further includes an accounting module configured to provide reports regarding sales for various periods of time. The accounting module is also configured to filter, sort, and catalog sales data for review. The store administration module also includes an uploader module configured to upload media files to the store administration module.

In operation of one embodiment of the invention, there is a user operating a store administration module. The user designs the layout and style of the store site by using the site designer module of the store administration module. The user reviews and edits the layout and style of the store site. The user may choose from a predetermined layout or style or create their own. The user uploads media files to the store administration module through the uploader module. The user then catalogs the media file into the catalog module of the store administration module. The user manages the account and reviews reports regarding sales through the accounting module. The store administration module is in communication with a network module configured to display media files over a computerized network.

Figure 8:
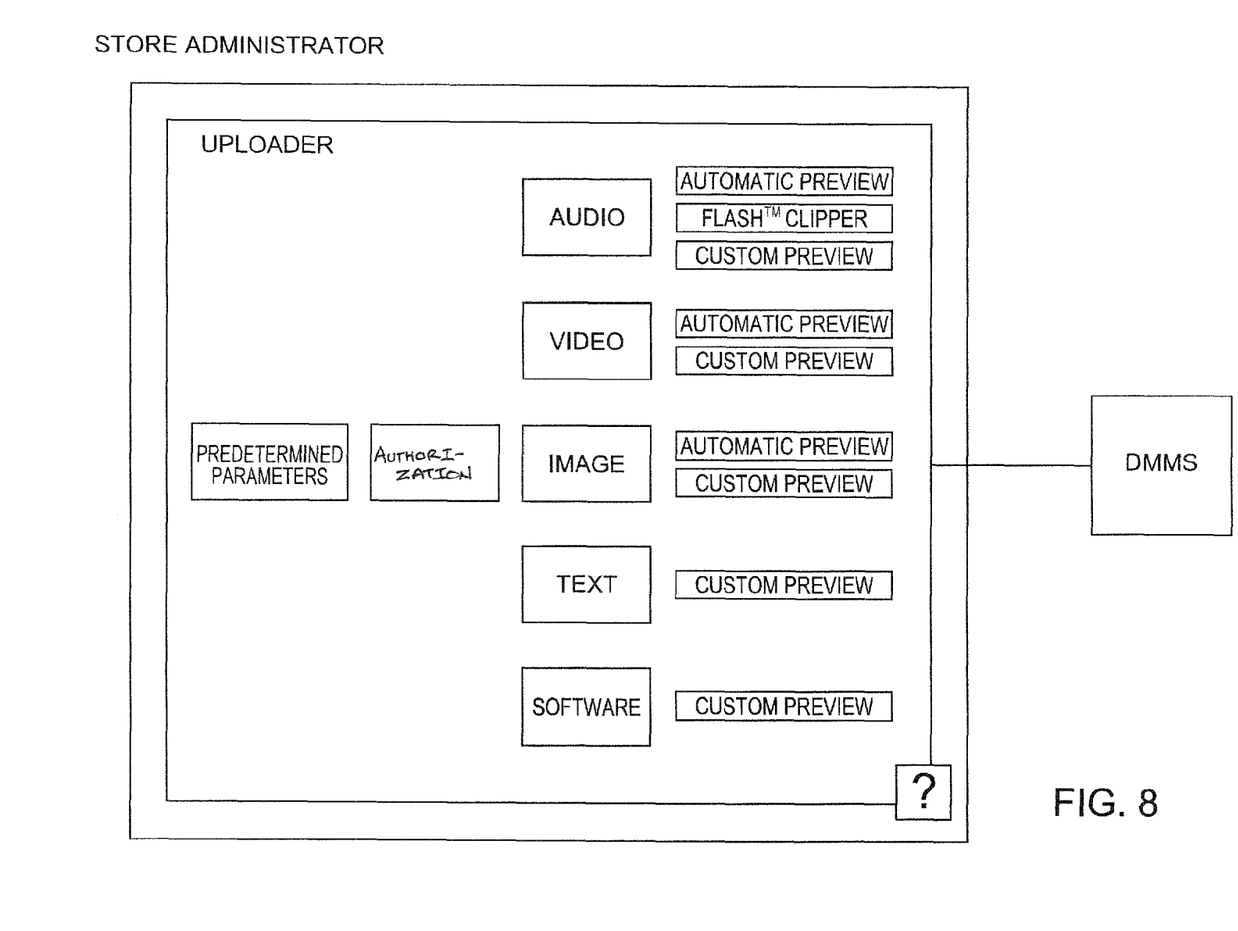
FIG. 8 is an exemplary example of an uploader module of a media distribution module, according to one embodiment of the invention.

FIG. 8 provides a more detailed view of an uploader module according to one embodiment of the invention. The uploader module is configured with pre-determined parameters set by the super administration module. Pre-determined parameters set by the super administration module may be but not limited to price restrictions, release dates, publisher restrictions, artist restrictions, genre restrictions, source restrictions, etc. The uploader module also includes an authorization module configured to authorize the content of the media being uploaded to the store administration module. The uploader module includes an audio module configured to modify the audio content of the media uploaded to the store administration module. In addition, the uploader module includes a video module configure to modify the video content of the media uploaded to the store administration module. The uploader module also includes a image module configured to modify the image content of the media uploaded to the store administration module. The uploader module includes a text module configured to modify text associated with the media uploaded to the store administration module. Furthermore, the uploader module includes a software module configured to provide software configuring capabilities of the media being uploaded to the store administration module. The uploader module also includes a preview module configured to provide a preview of the media display before available for purchase/download. The preview module includes an automatic preview module configured for automatic preview after any alteration to the media file uploaded and a custom preview module configured to enable a user to modify custom preview options for the media file before available for consumer purchase/download. Moreover, the uploader module includes a flash clipper module configured to enable a user to edit and clip a segment of the media file for consumer preview before purchase/download.

In operation of one embodiment of the invention, a user uploads media files to the store administration module using the uploader module. The media file is authorized by the authorization module in regards to pre-determined parameters set by the super administration module. The user edits the audio content, video content, image content, text content, and software capabilities of the media file being uploaded. The user previews the modified elements of the media file and uploads the media file to the store administration module for distribution over a computerized network.

According to one embodiment of the invention, there is a media distribution system configured to distribute media over a computerized network. The media distribution system may include a media distribution module configured to selectively permit access to media over a computerized network. The media distribution module may include a user interface module may have a downloader module configured to enable a user to download media from the media distribution module. The user interface module may also include a catalog module configured to provide media to download over a computerized network. Furthermore, the user interface module may include an accounting module configured to provide purchasing functions to a user downloading media from the media distribution module.

The user interface module may include an uploader module configured to facilitate the upload of media to the media distribution module. The uploader module may include an authorization module configured to authorize the media content being uploaded to the media distribution module. The uploader module may also include an audio module configured to modify the audio controls of media uploaded to the media distribution module and a video module configured to modify the video controls of media uploaded to the media distribution module. In addition, the uploader module may include a display module configured to display media uploaded on the media distribution module and a text module configured to modify text media data uploaded to the media distribution module. Moreover, the uploader module may include a preview module configured to view the media displayed on the media distribution module before the media is available for purchase.

The media distribution system may include an operational administration module in communication with the media distribution module and configured to facilitate operational management of the media distribution module by selectably altering operational parameters of the media distribution module. The operational administration module may include a registration module configured to register users to the media distribution module and a validation module configured to validate registered users to the media distribution module. The operational administration module may also include a design module configured to facilitate modification of the user interface module. The operational parameters may include parameters selected from the group of parameters consisting of: media price, temporal availability of media, image files available for use with the user interface module, position of display elements, associations with other media distribution modules, marketing affiliates, marketing materials, interface active status, user terms, user agreements, user interface access requirements, user interface size limitations, and user interface content limitations The media distribution system may also include a supervisory administration module in communication with the operational administration module and configured to selectably determine operational parameters available to the operational administration module for control. The supervisory administration module may be configured to facilitate operational management of the media distribution module by selectably altering operational parameters of the media distribution module and that effectuation of an operational parameter automatically alters permission to alter the same operational parameter by the operational administration module. The supervisory administration module may include a help module accessible by the operational administration module and wherein the supervisory administration module may edit the contents of the help module. In addition, the supervisory administration module may be configured to edit signup automation content and setup process for setup of an operational account used by a user of the operational administration module.

Furthermore, the media distribution system may include a network module in communication with the media distribution module and configured to transfer data over a computerized network. The media distribution system may include an aggregating portal module in communication with a plurality of media distribution modules and configured to provide a user interface wherein users may view and select media offered by each of the plurality of media distribution modules and configured to credit each associated media distribution module for associated media selected thereby.

Prophetic Example 1

In one non-limiting prophetic example, a record label sets up an account with a media distribution system according to one embodiment of the invention. The media distribution system provides the record label with access to a supervisory administration module. The record label uses the supervisory administration module to determine acceptable pricing for music sold under its label and logos that must be used in association with media distribution under its label. The record label does not place any restrictions on color schemes, page sizes, page setups or formats or other restrictions that might be available through the supervisory administration module. The record label then creates several authorized accounts and allows several artists (and/or their agents/managers/etc.) to each access an account. The account managers utilize operational administration modules that are preloaded with the restrictions placed by the record label through the supervisory administration module. Accordingly, the account managers can then create websites with a great deal of freedom where unrestricted, but with regards to pricing and other restricted parameters, will not be able to vary from the wishes of the record label. This allows the record label to enforce contract terms and to make sure that each of the account managers have maximum freedom of expression and freedom to be creative in creating distribution portals while making sure that everyone plays by the rules. The supervisory administration module of the example alters the data that controls the acceptable boundaries of variation for the website/portal/shopping cart construction tools of the operational administration module. It may also toggle access that the operational administration module may have to various tools, files, modules, and templates.

Prophetic Example 2

A non-profit group is sponsoring a fund raising event for medical research to fight breast cancer. The non-profit group would like to partner with local and national artists to provide an opportunity to give exposure to the artists while generating revenue and increased awareness of the event and need for the research. The non-profit group secures an account with a media distribution system and utilizes a supervisory administration module to develop a template to be used by all participating artists. A pink ribbon image is placed in the top left corner of the template and the background and text color choices are selected to be complimentary to the ribbon. Space is allocated to artist promotion images and to media listings. A single price is set for all media to be sold over the websites and the distribution of revenues through the shopping cart is hard-set to go to a trust account for the non-profit group. Artists are then provided with the opportunity to develop their own media distribution websites using the template as enforced by the operational administration modules that operate under instruction of the supervisory administration module. The artists place specific, unique recordings up for sale over the site. These websites are then promoted through the artists and non-profit's marketing channels and their combined efforts result in an orderly and professional fund raising event with worldwide scope.

Prophetic Example 3

A local aspiring party DJ decides to promote his talents and help his friends by setting up a group of cross-linked websites. The DJ wants to include as many people as possible and does not want to spend a lot of time managing the process. He sets up a super user account with a media distribution system and makes an operational administration module template that requires the display of certain links on certain positions on the page. It also redirects a portion of any proceeds from sale of media to the super user account that is used to help pay for new equipment for the parties. The DJ wants to make sure that the parties are always promoted, so all media distributed therethough must be in a video format instead of just allowing audio. The DJ lets his friends set up accounts for themselves using the templates and each participant then easily and automatically helps the others while supporting the venues that host their music. Later others decide to join the group and the DJ modifies the template to include additional forced links that may be propagated to new websites and/or to old websites in the system.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although particular communications and connections are illustrated in the drawings, it is understood that other connections and communications may exist in various embodiments of the invention that may be ancillary, supplementary, and/or alternative connections and communications to those in the illustrated drawings.

Additionally, although the figures illustrate particular interfaces and presentations of information, it is understood that the varieties of such that satisfy the limitations of the claims are plethoric.

It is also envisioned that embodiments of the invention may incorporate technologies not yet in existence and may operate in manners not yet contemplated.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A media distribution system configured to distribute media over a computerized network, comprising:
   a) a media distribution module configured to selectively permit access to media over a computerized network and including an interface module; wherein the interface module includes:
      a1) a downloader module configured to download media from the media distribution module;
      a2) a catalog module configured to provide media to download over a computerized network;
      a3) an accounting module configured to provide purchasing functions for downloading media from the media distribution module; and
      a4) an uploader module configured to facilitate the upload of media to the media distribution module; wherein the uploader module includes an authorization module configured to authorize the media content being uploaded to the media distribution module; wherein the uploader module comprises:
         i. an audio module configured to modify the audio controls of media uploaded to the media distribution module;
         ii. a video module configured to modify the video controls of media uploaded to the media distribution module;
         iii. a display module configured to display media uploaded on the media distribution module;
         iv. a text module configured to modify text media data uploaded to the media distribution module; and
         v. a preview module configured to view the media displayed on the media distribution module before the media is available for purchase;
   b) an operational administration module in communication with the media distribution module and configured to facilitate operational management of the media distribution module by selectably altering operational parameters of the media distribution module; wherein the operational administration module includes:
  b1) a registration module configured to register users to the media distribution module;
  b2) a validation module configured to validate registered users to the media distribution module; and
  b3) a design module configured to facilitate modification of the interface module; wherein the operational parameters includes parameters selected from the group of parameters consisting of: media price, temporal availability of media, image files available for use with the interface module, position of display elements, associations with other media distribution modules, marketing affiliates, marketing materials, interface active status, terms, agreements, interface access requirements, interface size limitations, and interface content limitations;
c) a supervisory administration module in communication with the operational administration module and configured to selectably determine operational parameters available to the operational administration module for control; wherein the supervisory administration module is configured to facilitate operational management of the media distribution module by selectably altering operational parameters of the media distribution module and that effectuation of an operational parameter automatically alters permission to alter the same operational parameter by the operational administration module; wherein the supervisory administration module is configured to edit signup automation content and setup process for setup of an operational account to allow use of the operational administration module;
d) a network module in communication with the media distribution module and configured to transfer data over a computerized network; and
e) an aggregating portal module in communication with a plurality of media distribution modules and configured to provide an interface to view and select media offered by each of the plurality of media distribution modules and configured to credit each associated media distribution module for associated media selected thereby.

2. A media distribution system configured to distribute media over a computerized network, comprising:
 a. a media distribution module configured to selectively permit access to media over a computerized network and including an interface module; wherein the interface module includes:
  a1) a downloader module configured to download media;
  a2) a catalog module configured to provide media to download;
  a3) an accounting module configured to provide purchasing functions for downloading media; and
  a4) an uploader module, configured to facilitate the upload of media, the uploader module comprises:
   1. an audio module, configured to modify audio controls of media uploaded;
   2. a video module, configured to modify the video controls of media uploaded;
   3. a display module, configured to display media uploaded on the media distribution module; and
   4. a text module, configured to modify text media uploaded to the media distribution module;
 b. an operational administration module, in communication with the media distribution module, configured to facilitate operational management of the media distribution module by selectably altering operational parameters of the media distribution module; wherein the operational administration module includes:
  b1) a registration module, configured to register users to the media distribution module;
  b2) a validation module, configured to validate use of the media distribution module; and
  b3) a design module, configured to facilitate modification of the interface module; wherein operational parameters of the design module includes parameters selected from the group of parameters consisting of: media price, temporal availability of media, image files available for use with the interface module, position of display elements, associations with other media distribution modules, marketing affiliates, marketing materials, interface active status, agreements, interface access requirements, interface size limitations, and interface content limitations;
 c. a supervisory administration module, in communication with the operational administration module, and configured to selectably determine operational parameters available for control;
  wherein the supervisory administration module is configured to facilitate operational management of the media distribution module by selectably altering operational parameters of the media distribution module and that effectuation of an operational parameter automatically alters permission to alter the same operational parameter by the operational administration module; wherein the supervisory administration module is configured to edit signup automation content and setup process for setup of an operational account to allow use of the operational administration module;
 d. a network module, in communication with the media distribution module, and configured to transfer data over a computerized network; and
 e. an aggregating portal module, in communication with at least one media distribution modules, and configured to provide an interface to view and select media offered by each of the plurality of media distribution modules and configured to credit each associated media distribution module for associated media selected thereby.

3. A media distribution system, configured to distribute media over a computerized network, comprising:
 a) a media distribution module, configured to selectively permit access to media over a computerized network, and including an interface module; wherein the interface module includes:
  a1) a downloader module, configured to download media;
  a2) a catalog module, configured to provide media to download; and
  a3) an uploader module, configured to facilitate the upload of media,
 b) an operational administration module, in communication with the media distribution module, configured to facilitate operational management of the media distribution module by selectably altering operational parameters of the media distribution module; wherein the operational administration module includes:
  b1) a registration module, configured to register users to the media distribution module; and
  b2) a validation module, configured to validate use of the media distribution module;
 c) a supervisory administration module, in communication with the operational administration module, and configured:

to selectably determine operational parameters available for control;

to facilitate operational management of the media distribution module by selectably altering operational parameters of the media distribution module and that effectuation of an operational parameter automatically alters permission to alter the same operational parameter by the operational administration module;

to edit signup automation content and setup process for setup of an operational account to allow use of the operational administration module;

d) a network module, in communication with the media distribution module, and configured to transfer data over a computerized network; and e) an aggregating portal module, in communication with at least one media distribution modules, and configured to provide an interface to view the media.

4. The media distribution system of claim 3, wherein the operational administration module further includes a design module configured to facilitate modification of the interface module; wherein the operational parameters includes parameters selected from the group of parameters consisting of: media price, temporal availability of media, image files available for use with the interface module, position of display elements, associations with other media distribution modules, marketing affiliates, marketing materials, interface active status, agreements, interface access requirements, interface size limitations, and interface content limitations.

* * * * *